(12) United States Patent
Murashita et al.

(10) Patent No.: US 7,729,543 B2
(45) Date of Patent: Jun. 1, 2010

(54) IMAGING APPARATUS

(75) Inventors: Kimitaka Murashita, Kawasaki (JP); Masayoshi Shimizu, Kawasaki (JP); Shoji Suzuki, Kawasaki (JP); Yasuto Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 823 days.

(21) Appl. No.: 11/618,179

(22) Filed: Dec. 29, 2006

(65) Prior Publication Data

US 2008/0037881 A1 Feb. 14, 2008

(30) Foreign Application Priority Data

Aug. 8, 2006 (JP) ............... 2006-216010

(51) Int. Cl.
*G06K 9/46* (2006.01)
*H04N 5/228* (2006.01)

(52) U.S. Cl. .................. 382/190; 382/232; 348/94; 348/208.99

(58) Field of Classification Search ......... 382/190–208, 382/232–253, 266–269, 275–276, 291; 348/94–95, 348/208.99, 208.3
See application file for complete search history.

(56) References Cited

U.S. PATENT DOCUMENTS 6,005,978 A * 12/1999 Garakani .................... 382/218
6,195,462 B1 * 2/2001 Bryniarski et al. .......... 382/239
6,226,414 B1 * 5/2001 Go ............................. 382/240
6,477,279 B2 * 11/2002 Go ............................. 382/240
7,613,363 B2 * 11/2009 Platt et al. ................... 382/299
2001/0016078 A1 * 8/2001 Go ............................. 382/240
2002/0051582 A1 * 5/2002 Go ............................. 382/240
2003/0026457 A1 * 2/2003 Nahum ....................... 382/106

FOREIGN PATENT DOCUMENTS

| JP | 2004-234624 | 8/2004 |
|----|-------------|--------|
| JP | 2004-343483 | 12/2004 |
| JP | 2005-197911 | 7/2005 |

* cited by examiner

*Primary Examiner*—Manav Seth

(57) ABSTRACT

In an imaging apparatus, a JPEG coding unit makes JPEG data by respectively compressing plural images obtained from an imaging device. A code retention unit retains each JPEG data. A thumbnail data creation unit creates a thumbnail from each of the images. A thumbnail retention unit retains the thumbnail. A feature point detection unit detects a feature point from the thumbnail. A partial image decode unit respectively decodes zones including the feature points from each JPEG data. A displacement amount calculation unit obtains positional information of feature points in the decoded individual zones and calculates a displacement amount of each JPEG data based on the positional information.

8 Claims, 17 Drawing Sheets

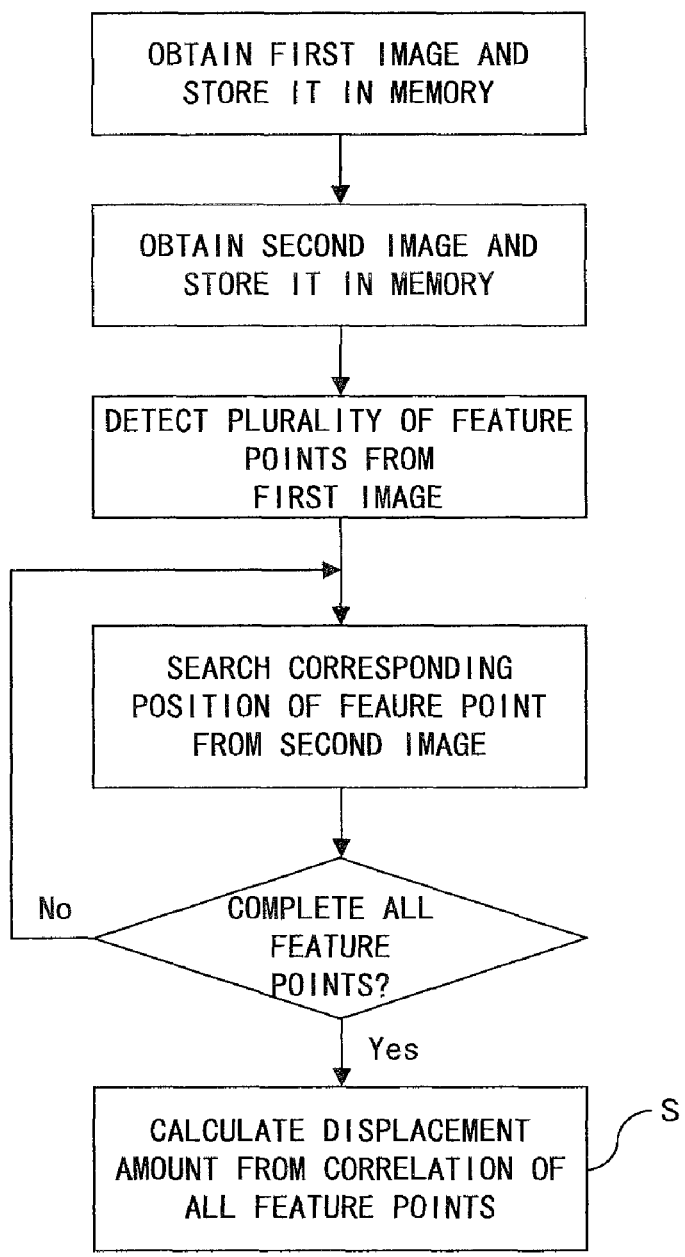
F I G. 1

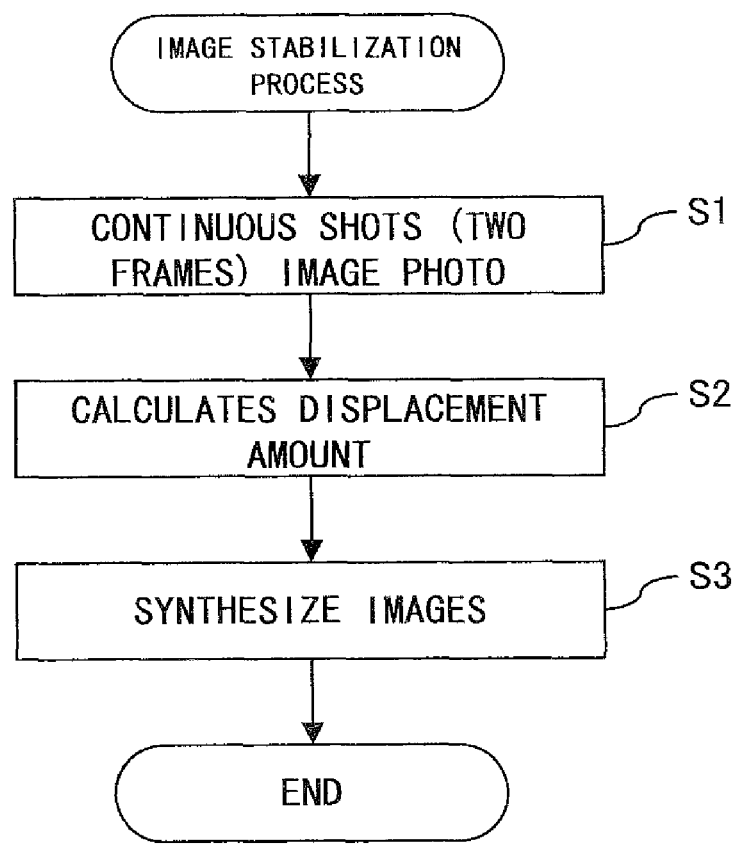
F I G. 3

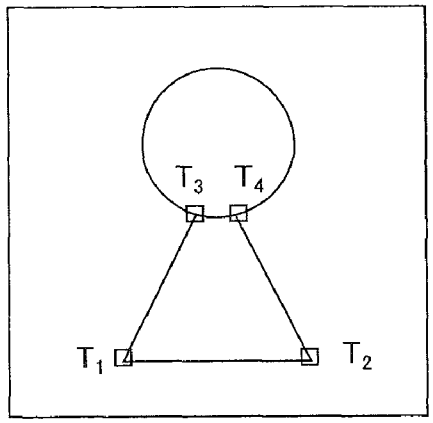
(a)
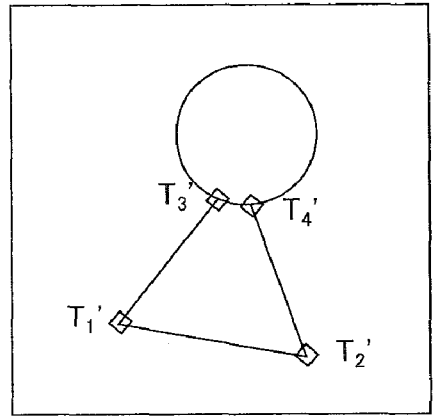
(b)
$\Delta T_1 = T_1 \sim T_1'$
$\Delta T_2 = T_2 \sim T_2'$
$\Delta T_3 = T_3 \sim T_3'$
$\Delta T_4 = T_4 \sim T_4'$
F I G. 5

ORIGINAL IMAGE (REFERRED DATA)
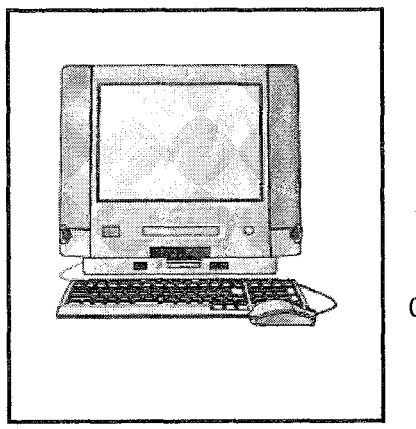
COMPRESSION
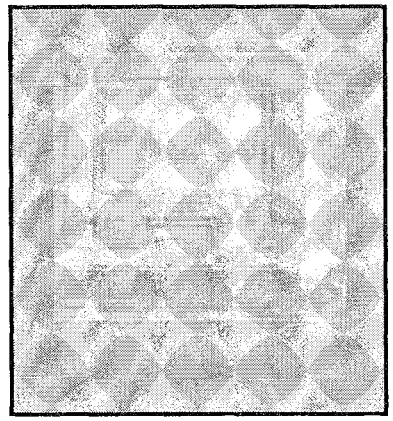
COMPRESSED DATA
ORIGINAL IMAGE (REFERRED DATA)
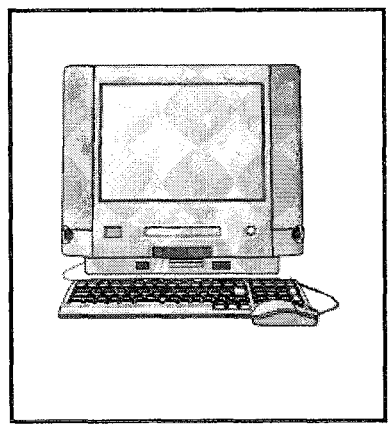
REDUCTION
THUMBNAIL
F I G. 7

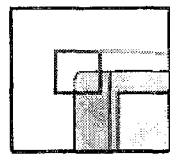 FEATURE POINT T1
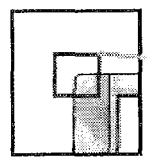 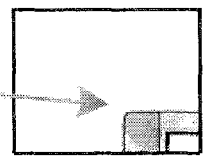
FEATURE POINT T1→T1'    COORDINATE(x1, y1)→COORDINATE(x1', y1')
F I G. 1 0

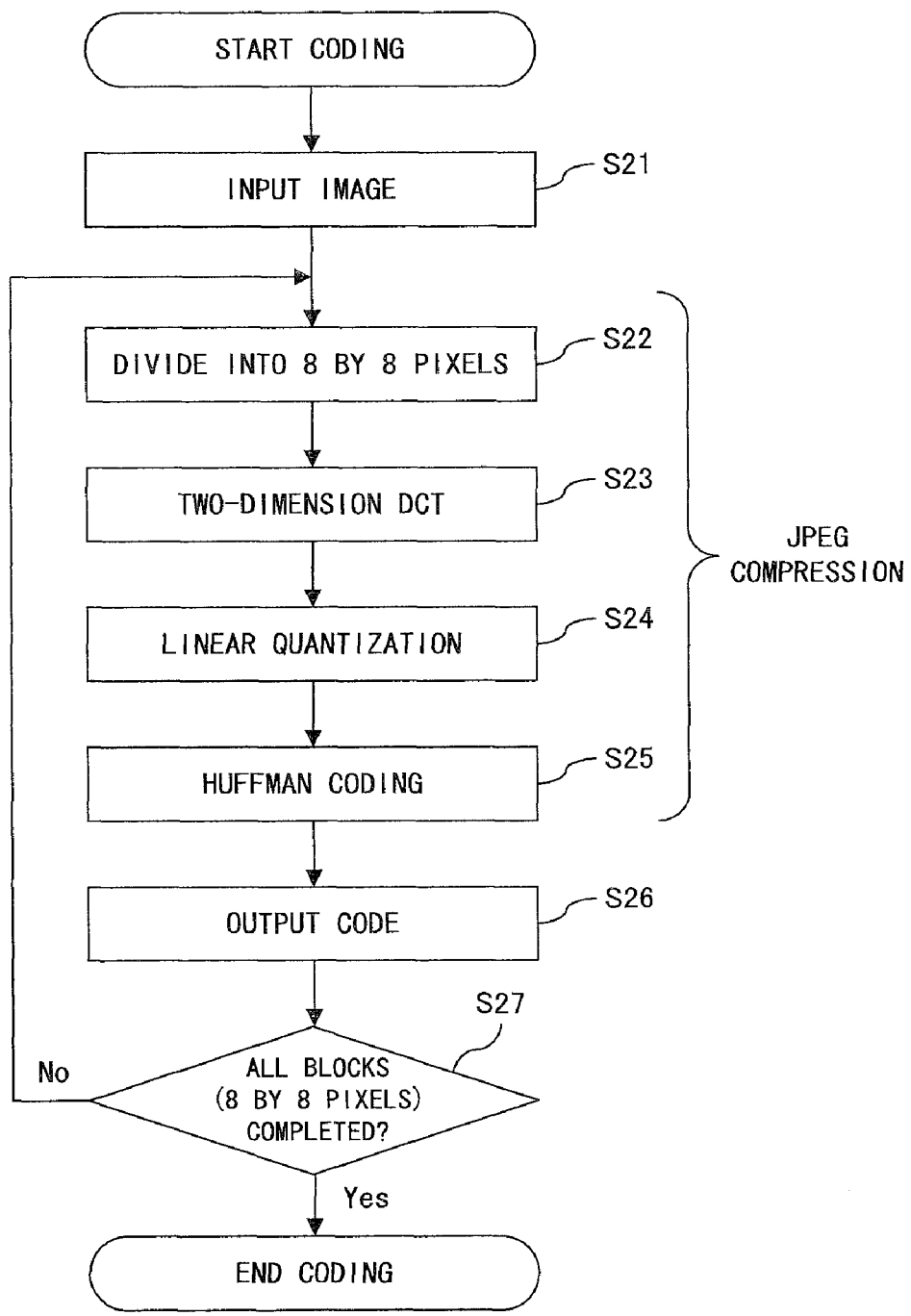
F I G. 1 2

ORIGINAL IMAGE
(DATA TO BE REFERRED TO)
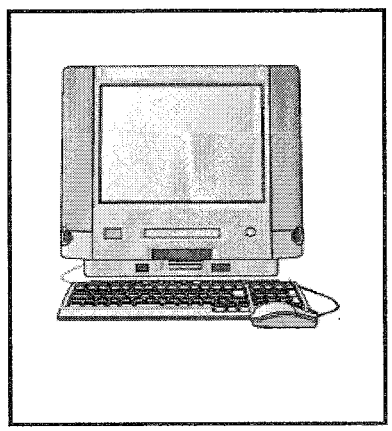
COMPRESSION
COMPRESSED DATA
ORIGINAL IMAGE
(DATA TO BE REFERRED TO)
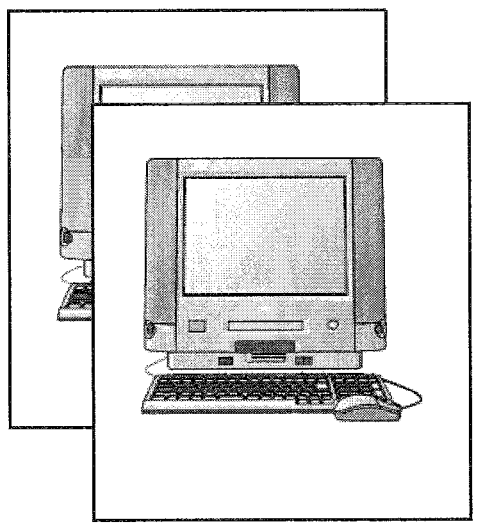
REDUCTION
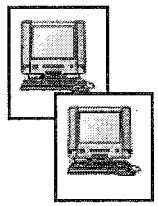
THUMBNAILS
F I G. 1 5

IMAGING APPARATUS

BACKGROUND OF THE INVENTION

1. Field of the Invention

The present invention relates to an imaging apparatus and in particular to a technique for correcting a displacement between images.

2. Description of the Related Art

Various techniques have conventionally been provided for correcting a displacement between images when synthesizing a plurality of static images photographed by a digital camera. A technique for correcting a displacement between images due to an unsteady camera is suitable to processing an image photographed in the dark because an exposure time required for photographing therein is longer, increasing the occurrence of an unsteady camera. Specifically, there are methods of correcting an unsteady camera (also noted as "image stabilization method" hereinafter) by means of hardware and software. The image stabilization method by means of hardware includes a lens shift system which moves lens in the direction opposite to an actual moving direction of the camera, and a CCD (charge coupled device) shift system.

As to a technique for stabilizing image by software, provided is a technique which reduces an input image in a plurality of steps, utilizes a global shift amount roughly obtained by using a reduced image on a lower layer level and builds up a scan block when obtaining a local shift amount on a higher level, thereby making it possible to minimize a scan block set for a second image (refer to a patent document 1 for example). Another provision is a technique capable of speeding up a process for synthesizing a plurality of digital image data by making and storing a thumbnail for each of synthetic images in the case of performing a synthesizing process by using a plurality of image data (refer to a patent document 2 for example).

At this point, a description is a detail on a conventional calculation method of a displacement between images among image stabilization techniques by means of software. FIG. 1 is a flow chart showing a displacement amount calculation process according to a conventional technique. The conventional technique obtains, in memory, a plurality of image data acquired from an imaging apparatus and detects a feature point (i.e., an edge) in each image, thereby calculating the displacement amount of each image when making a synthetic image by calculating respective displacement amounts related to a plurality of images and correcting the displacements as shown in the flow chart of FIG. 1.

Additionally, as to an image stabilization technique using software, provided is a technique of detecting an unsteady camera by means of software (refer to a patent document 3 for example).

[Patent document 1] Laid-Open Japanese Patent Application Publication No. 2004-343483

[Patent document 2] Laid-Open Japanese Patent Application Publication No. 2004-234624

[Patent document 3] Laid-Open Japanese Patent Application Publication No. 2005-197911

The above noted lens shift system and CCD shift system are both faced with a problem of an increased cost because hardware must be added to a camera for moving hardware such as a lens, CCD, et cetera. Another problem associated with these methods is that means of the image stabilization is prone to a shock and easy to fail.

As for an image stabilization method using software, individual images must be positioned with each other before compounding the first and second images as described above. Accordingly exercised is to detect a feature point from the first image and obtain a position corresponding to the feature point in the second image and calculate a displacement amount from the difference of positions between the images. Such a calculation method of a displacement amount requires the process regarding the entirety of the image for detecting a feature point and searching a position corresponding thereto. However, a memory capacity for storing a plurality of images tends to get larger in proportionate with digital cameras with bigger pixels, and it causing an increase of cost. Also associated with digital cameras with bigger pixels, processes for an image stabilizer increase, hence it creates a problem of increasing the processing time.

SUMMARY OF THE INVENTION

The purpose of the present invention is to provide a technique enabling a reduced memory capacity and a high speed image process in an imaging apparatus.

In order to solve the above described problems, an imaging apparatus according to the present invention comprises: a compression unit for making compressed data by respectively compressing each piece of plural images obtained from an imaging device; a compressed data retention unit for retaining each compressed data; a thumbnail creation unit for creating a thumbnail from each of the image data; a thumbnail retention unit for retaining the thumbnail; a detection unit for detecting a feature point from the thumbnail; a decode unit for respectively decoding zones including the feature point from each compressed data; and a calculation unit for obtaining positional information of the feature point in each of the decoded zones and calculating a displacement amount of each compressed data based on the positional information.

The present invention is contrived to compress, and retain, a plurality of images to be synthesized. A calculation of displacement amount is carried out by detecting a feature point from a thumbnail in advance, followed by decoding a zone only corresponding to the feature point detected from the thumbnail from among the compressed data. It is followed by obtaining positional information of the feature point for each piece of the compressed data by using the decoded data and calculating a displacement amount. The process for calculating the displacement amount is not required to perform for the entirety of an image and the temporarily retained data during the process are compressed data, thereby making it possible to suppress a memory capacity to be secured for calculating a displacement amount small and increase a process speed.

The thumbnail creation unit may be configured to create one thumbnail corresponding to certain compressed data among the plural compressed data. In this case, the decode unit is preferably configured to cover larger area for decoding from compressed data other than compressed data corresponding to the thumbnail than an area for decoding from the immediately aforementioned compressed data.

An alternative configuration may be in a manner that the thumbnail creation unit creates a first and a second thumbnails corresponding to the first and second compressed data, the detection unit detects the feature points from the first and second thumbnails, respectively, and the decode unit decodes for zones including respective feature points from the first and second compressed data based on a displacement of positions between feature points detected from the first and second thumbnails.

Furthermore, a zone decoded by the decode unit may be configured to be made up of 8M by 8N pixels (where M and N are natural numbers). In the case of compressed data being a JPEG (Joint Photographic Experts Group) format for instance, a process can be sped up by excluding extraneous processing.

The present invention enables to lower a memory capacity to be secured and speed up carrying out a process of synthesizing a plurality of images at an imaging apparatus.

BRIEF DESCRIPTION OF THE DRAWINGS

FIG. 1 is a flow chart showing a displacement amount calculation process according to a conventional technique;

FIG. 3 is a flow chart showing an image stabilization process;

FIG. 5 is a diagram for describing a process for calculating a displacement amount from a position of a feature point;

FIG. 7 is a diagram for describing data used for an image stabilization process according to a first embodiment;

FIG. 10 is a diagram for describing a process for comparing feature points between partial images of compressed data;

FIG. 12 is a flow chart showing a coding process;

FIG. 15 is a diagram for describing data used for an image stabilization process according to a second embodiment;

DESCRIPTION OF THE PREFERRED EMBODIMENTS

The following is a detailed description of the preferred embodiment of the present invention by referring to the accompanying drawings.

Figure 2:
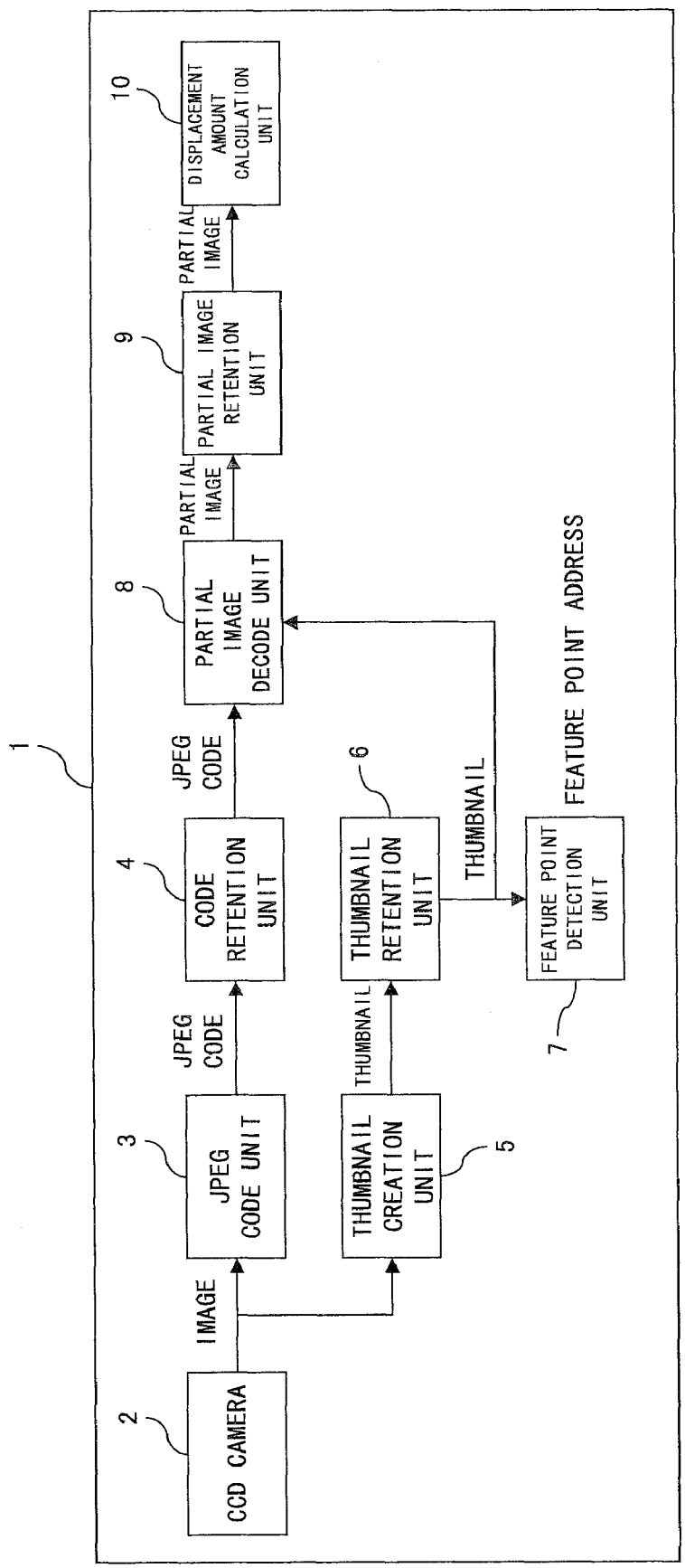
FIG. 2 is a block diagram of an imaging apparatus according to the present invention.

FIG. 2 is a block diagram of an imaging apparatus according to the present invention. The imaging apparatus 1 shown in FIG. 2 comprises an image stabilization function, being used as an independent apparatus or one incorporated in a portable phone to be used therein, for correcting a displacement among images continuously photographed. The imaging apparatus comprises a CCD camera 2, a code unit 3, a code retention unit 4, a thumbnail creation unit 5, a thumbnail retention unit 6, a feature point detection unit 7, a partial image decode unit 8, a partial image retention unit 9 and a displacement amount calculation unit 10.

The CCD camera 2 photographs an object. The code unit 3 converts the raw data obtained by the CCD camera 2 for example into compressed data such as JPEG, PNG (Portable Network Graphics), TIFF (Tagged Image File Format), et cetera. The following describes on an example converting raw data to data of a JPEG format. The code retention unit 4 retains the coded data by the code unit 3.

The thumbnail creation unit 5 creates a thumbnail from the raw data. The thumbnail retention unit 6 retains the created thumbnail. The feature point detection unit 7 detects a feature point from the thumbnail.

The partial image decode unit 8 partially decodes the coded data based on information on the feature point, which is detected by the feature point detection unit 7, within the thumbnail. The partial image retention unit 9 retains the decoded partial image data. The displacement amount calculation unit 10 calculates a displacement amount between the images retained by the code retention unit 4 by using the decoded partial image data.

Note that FIG. 2 shows a comprisal related to the image stabilization process, while omits other comprisals. For example, when the displacement amount calculation unit 10 calculates a displacement amount between coded data, the calculation result is provided to an image synthetic unit (not shown herein), and an image stabilizer-corrected synthetic image is created for plural coded data retained by the code retention unit 4.

FIG. 3 is a flow chart showing an image stabilization process in the imaging apparatus 1. First, step S1 photographs a plurality of images, that is, defined as images obtained by continuously shooting, et cetera, two or more frames for example. Step S2 calculates a displacement amount. As described for FIG. 2, the present embodiment is configured to calculate a displacement amount among plural JPEG data based on a feature point detected from the thumbnail. Step S3 corrects the displacement among JPEG data and creates a synthetic image, followed by terminating the process.

As described above, the imaging apparatus 1 shown in FIG. 2 is configured to use coded data by decoding partially to compare between images, instead of by decoding the entirety of the JPEG data, for a displacement amount calculation process (i.e., the process of the step S2). And the image synthesizing process (i.e., the process of the step S3) synthesizes JPEG data with one another. The following is a specific description on a displacement amount calculation method.

Figure 4:
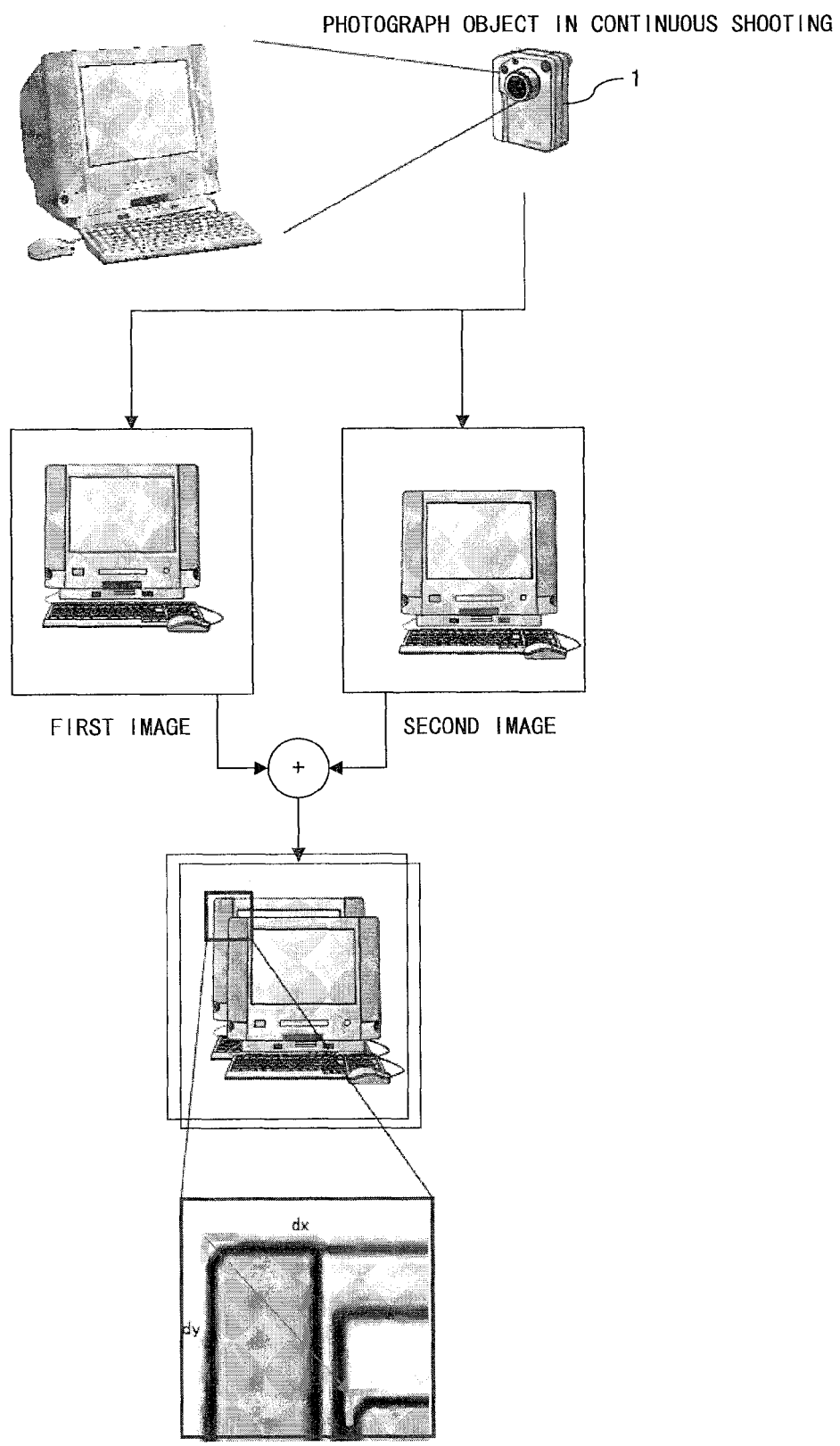
FIG. 4 is a diagram for describing an outline of a process for calculating a displacement amount from plural image data.

FIG. 4 is a diagram for describing an outline of a process for calculating a displacement amount from plural image data, showing the case of obtaining a consecutive two images from the imaging apparatus 1. Position coordinates of figures within images are usually not completely identical between the first and second images because of an unsteady camera, et cetera. Consequently, a figure is dualized if images are simply overlapped with one another without considering the non-identicalness of the position coordinates of the figures. Accordingly performed for obtaining a sharp figure without allowing a dualization in a synthetic image is to calculate a displacement amount of positions of a figure between the first and second images and move the first image for example by the amount of the displacement so as to overlap the second image, followed by synthesizing the two images.

FIG. 5 is a diagram for describing a process for calculating a displacement amount from a position of a feature point. Here, the description exemplifies the case of extracting four feature points.

In the image shown on the left side of FIG. 5, the position coordinates of four feature points T1, T2, T3 and T4 are obtained, and in the image shown on the right side of FIG. 5, it is defined that feature points T1' through T4' are corresponding to the feature points T1 through T4 of the image shown on the left, then a displacement amount $\Delta Ti$ (where i=1, 2, 3 and 4) is expressed by relative coordinates Ti and Ti'.

FIG. 5 shows the case of a displacement due to a translation and a rotation between the two images. If a displacement between images can be corrected by a parallel movement, a displacement amount (dxi, dyi) is calculated for each feature point. If a rotational movement is also included, a displacement amount is calculated by using an affine conversion coefficient for example.

Figure 6:
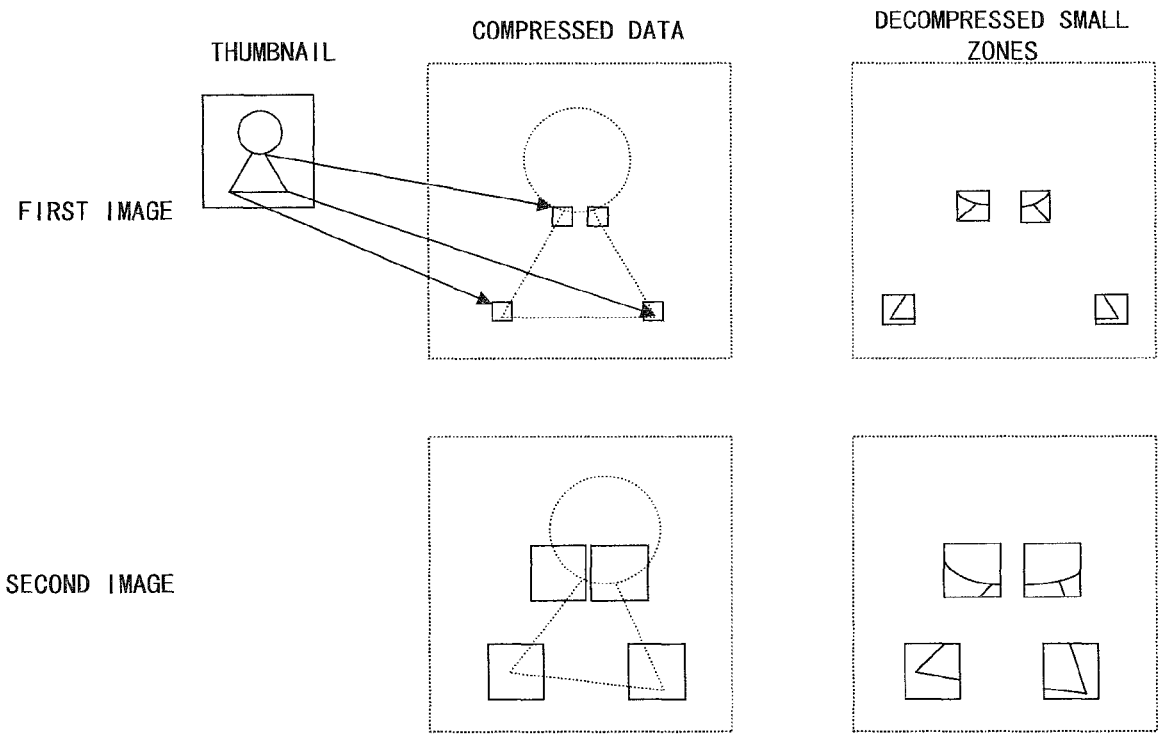
FIG. 6 is a diagram for describing an outline of a decoding process of a partial image.

FIG. 6 is a diagram for describing an outline of a decoding process of a partial image. The present embodiment is configured to extract the above described feature point from a thumbnail. And obtain a point corresponding to the feature point detected from the thumbnail from JPEG data that is the compressed data to be synthesized and decode the surrounding zone only. Then obtain feature points from the decoded partial images, respectively, and calculate a displacement amount between the first and second images by comparing the positions of respective feature points as described by referring to FIG. 5.

Note that the descriptions have been provided for the case of the feature points being four in the examples shown in FIGS. 5 and 6, it is not apparently limited as such, however. Instead, it is possible to prevent a degradation of accuracy in a displacement amount calculation due to mishandling of a feature point to be correlated between the first and second images by calculating a displacement amount by using as many feature points as possible.

FIG. 7 is a diagram for describing data used for an image stabilization process according to the present embodiment. Referring to FIG. 7, the upper part shows the process for obtaining JPEG data by compressing (i.e., coding) image data which has been obtained by the CCD camera 2, while the lower part shows the process for creating a thumbnail from the image data obtained by the CCD camera 2. The example of FIG. 7 shows the thumbnail on the right bottom in the drawing in the case of creating it for one of two images, that is, the first image in this case.

Assuming a capacity of one frame of raw data to be approximately 6 megabytes (MB) and a compression ratio to be 1/10, a memory capacity required for synthesizing three images is 1.8 MB (=6*(1/10)*3). Comparably, the conventional technique has memory temporarily retain the raw data for creating a synthetic image, requiring a memory capacity of 18 MB (=6*3). The present embodiment greatly reduces the memory capacity. As for the thumbnail, the size for example is 128 by 96 pixels, and therefore the memory capacity to be secured for carrying out an image stabilization process is greatly suppressed.

Figure 8:
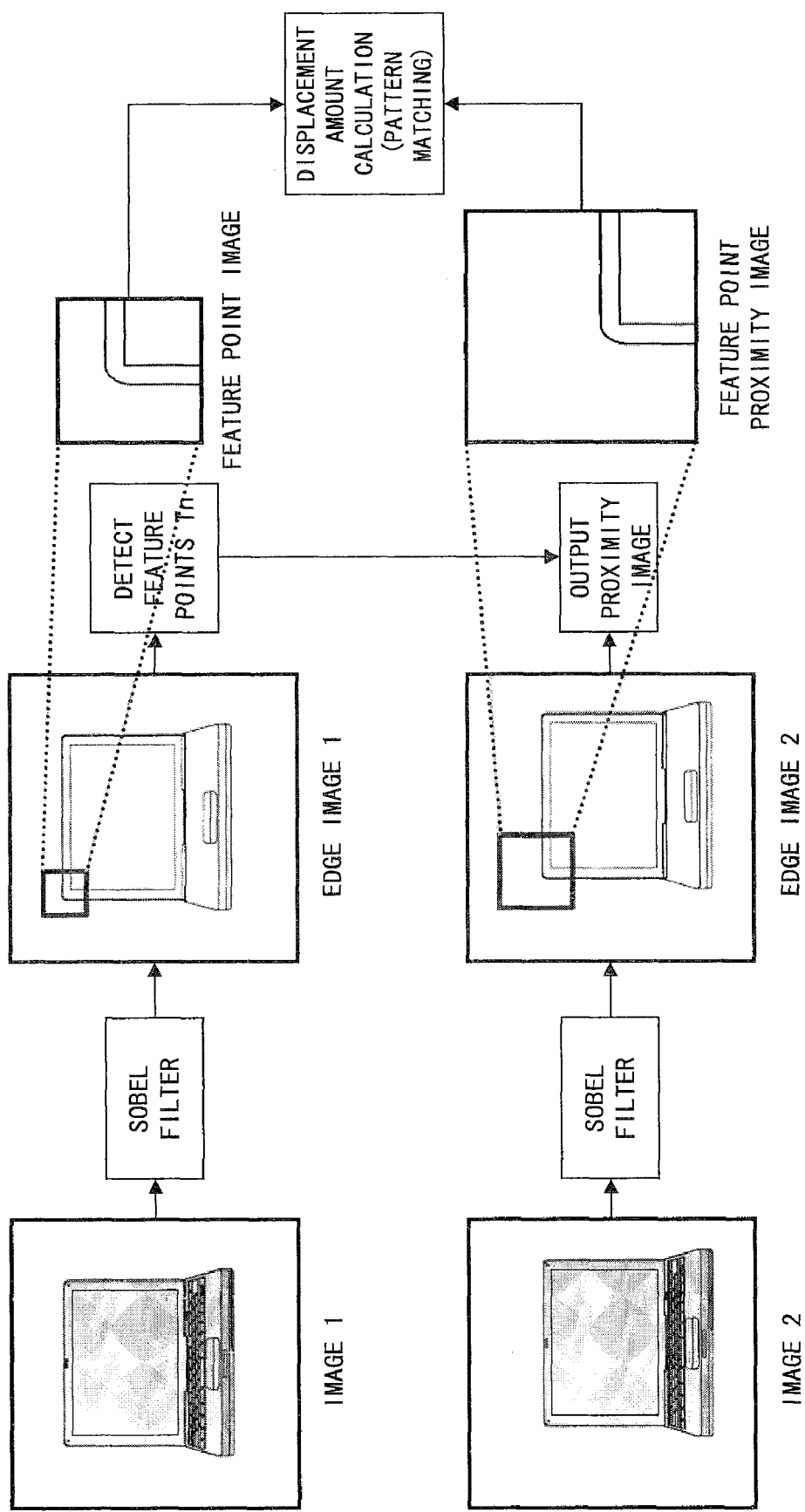
FIG. 8 is a diagram showing a flow until a completion of calculating a displacement amount between images.

FIG. 8 is a diagram showing a flow until a completion of calculating a displacement between images. The assumption is that the image 1 and image 2 which are shown in FIG. 8 correspond to the first and second images of JPEG data, respectively, and a thumbnail is created by using the raw data, based on which the image 1 is constituted.

The first step extracts, and decodes, the first and second images by the unit of block of a predetermined size, respectively, followed by detecting an edge by using a known technique such as a Sobel filter. The next determines whether or not a point corresponding to a feature point of the thumbnail exists in the detected edge and detects the feature point in the decoded data.

The position coordinates within the first and second images regarding a certain feature point can be considered to be closer to each other as compared to a feature point detected from another edge. Taking advantage of this, the present embodiment is configured to detect a feature point in a second image by searching a part corresponding to a feature point of a first image when the feature point is detected therefrom.

A partial image close to a feature point detected from the second image is to be preferably set larger than a partial image extracted from the first image. That is, it is necessary to divide one image into a plurality thereof likewise the first image, decode it partially and search a feature point, in order to detect, from the second image, a feature point detected from the first image of the size of one block. In the case that there is a displacement in a position of a figure between the first and second images due to an unsteady camera, however, an extraction of the same pixel may be faced with a possibility of the corresponding feature point being not detected. This is the reason for making an image element, which is to be extracted, larger for the second image and thereafter than an image element for the first image.

Incidentally, FIG. 8 shows the entirety of the image, actual process, however, extracts data by the unit of block as described above and carries out a process for each block.

Figure 9:
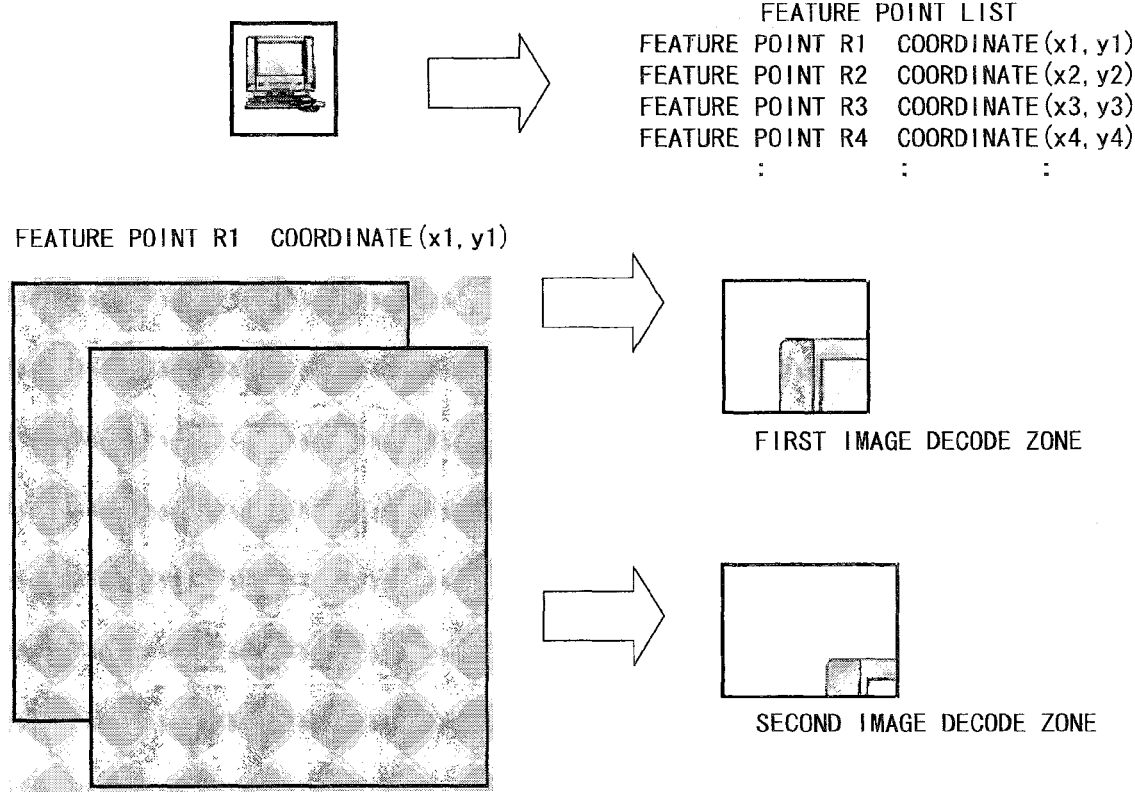
FIG. 9 is a diagram for describing a process for extracting a partial image of compressed data based on a thumbnail.

FIG. 9 is a diagram for describing a process for extracting a partial image of compressed data based on a thumbnail. This assumes a detection of four feature points from a thumbnail corresponding to compressed data of the first image. The following is a description exemplifying one feature point R1 (x1, y1) from among the four feature points.

First step extracts a zone corresponding to a feature point R1, respectively, among coded data of the first and second images. In this event, a zone of a partial image extracted from the second image is to be preferably larger than that of a partial image of the first image, considering that a feature point may necessarily not exist in the same zone as that of the first image because there is a displacement in a position of a figure between two images.

FIG. 10 is a diagram for describing a process for comparing feature points between partial images of compressed data. The first detects feature points T1 and T1' corresponding to a feature point R1 of a thumbnail from respective compressed data. The next specifies a range to be decoded as a partial image from wider zone regarding compressed data on the side not correlated with a thumbnail as described by referring to FIG. 9.

The next decodes the part specified by the range and compares between the first and second images. The same process is performed for the remaining three feature points R2, R3 and R4, followed by calculating an amount for making the second image move to overlap with the first image, that is, a displacement amount.

Figure 11:
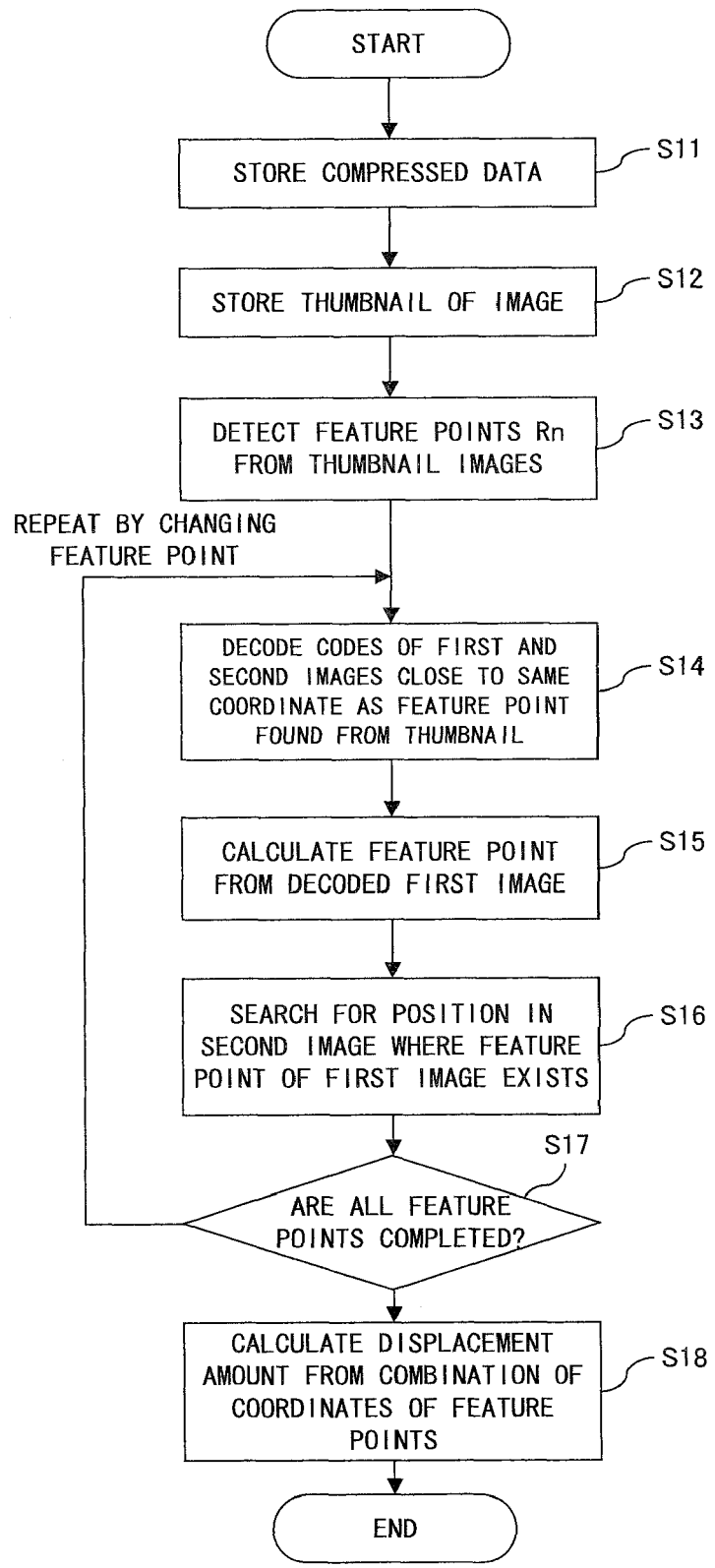
FIG. 11 is a flow chart showing a displacement amount calculation process according to the first embodiment.

FIG. 11 is a flow chart showing the entirety of a displacement amount calculation process in the case of creating a sheet of thumbnail. A series of processes shown in FIG. 11 is started when recognizing the event of obtaining image data continuously from the CCD camera 2, for example, as trigger.

First, step S11 makes compressed data of obtained plural image data and store them in memory. Step S12 creates a thumbnail of the first image and stores it in memory.

Step S13 detects a feature point (Rn) from the thumbnail. Processes of using a Sobel filter for detecting an edge and detecting a feature point from the edge are the same as described above.

Step S14 partially decodes proximity position corresponding to the feature point Rn, which is detected from the thumbnail, from the first and second images which are compressed data. Step S15 detects a feature point (Tn) from a partial image of the decoded first image. Then step S16 searches a position of the feature point Tn, which is detected from the first image, in the second image.

Step S17 determines whether or not a position of each of all the feature points Rn, which are detected from the thumbnail, within the compressed data has been obtained. If the obtainment is not completed for all the feature points Rn, the process returns to the step S14 for repeating it until the positions of feature points corresponding to all the feature points Rn are obtained.

If the obtainment is completed for all the feature points Rn, the step S17 shifts to the S18 in which a displacement amount is calculated based on the result obtained in the steps S15 and S16, the process terminates.

FIG. 12 is a flow chart showing a coding process, specifically showing the process for making JPEG data which is stored in the above described step S11. Incidentally, the process shown in FIG. 12 is a common coding process.

First, step S21 inputs data obtained by the CCD camera 2 to the code unit 3 shown in FIG. 2, and step S22 divides the input image data into 8 vertical by 8 horizontal pixels. The process of the S22 is described later. Then, the step S23 converts the image data into a frequency domain by the unit of block of the divided 8 by 8, by means of a two-dimension discrete cosine transform (DCT). Step S24 reduces the information volume by means of a linear quantization, and step S25 performs an entropy coding by means of a Huffman coding followed by the step S26 outputting the obtained code. Step S27 determines whether or not the coding of all the blocks divided into 8 by 8 has been completed, and repeats the processes of the steps S22 through S26 for each block until coding of all the blocks are completed.

Figure 13:
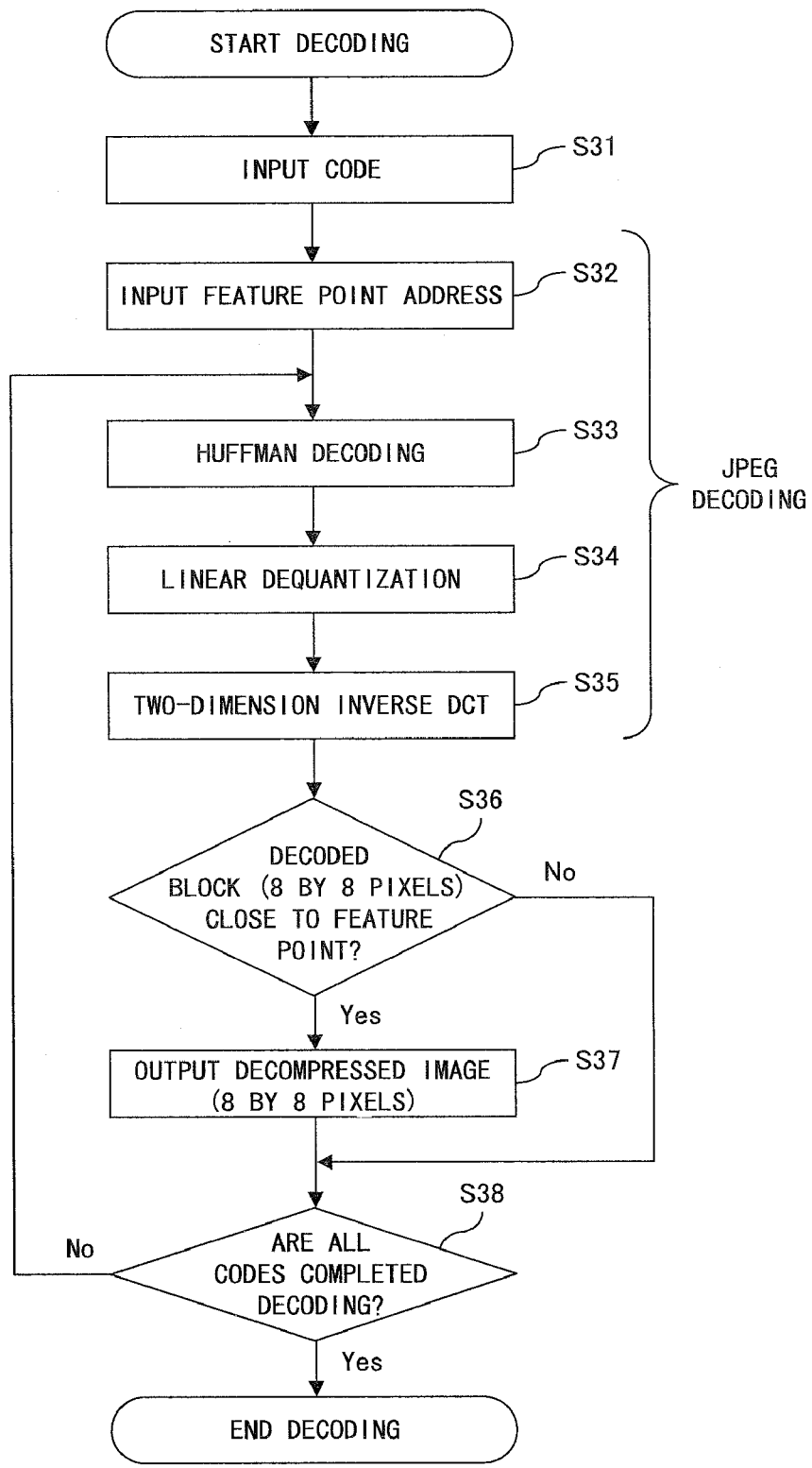
FIG. 13 is a flow chart showing a decoding process.

FIG. 13 is a flow chart showing a decoding process, showing the process of the above described step S14 in detail.

First, as the step S31 inputs code data, step S32 inputs, to the partial image decode unit 8, an address of an area of memory storing feature point information indicating positions of feature points Rn of the thumbnail.

Step S33 performs a Huffman decoding by the unit of block, step S34 carries out a linear dequantization and step S35 performs a two-dimensional inverse DCT. Then, step S36 determines whether the decoded 8-by-8 block is close to the feature point which is stored in the area indicated by the address of the step S32, that is, to determine whether or not the decoded block includes feature points Tn corresponding to the feature points Rn which are detected from the thumbnail. If the feature point Tn is included within the block, step S37 outputs the decompressed image as a partial image, while if a feature point Tn is not detected, then no process is performed.

Then, proceeding to the step S38, determines whether or not a decoding process is completed for each code data. If a block unprocessed of decoding still remains, the process shifts to the step S33 for carrying out a series of processes of the steps S33 through S37. Upon completing decoding processes for all the blocks, the process terminates.

Note that the coding and decoding processes respectively shown in FIGS. 12 and 13 are carried out by the unit of block that is 8 by 8 pixels. The next is a description on a size of a partial image.

Figure 14:
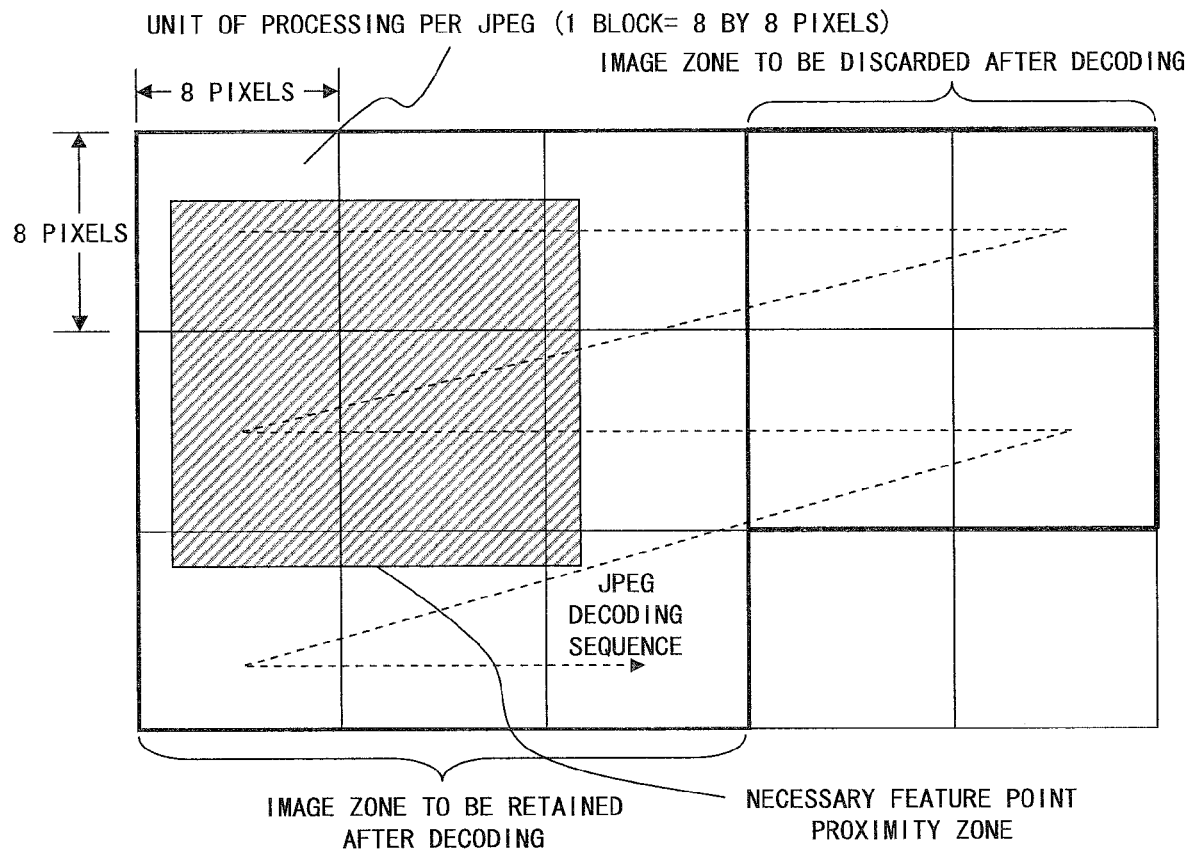
FIG. 14 is a diagram illustrating a JPEG block and feature point proximity zones.

FIG. 14 is a diagram illustrating a JPEG block and feature point proximity zones. Data of JPEG format is coded, and decoded, by a raster scan system. Referring to FIG. 14, let it be assumed that a feature point is detected from the shaded part. In this event, the shaded area spans from the zeroth block to the second block in the horizontal direction, and therefore a partial image of the zeroth through second blocks are only retained, while the partial image of the third block and rightward blocks can be judged to be unused for calculating a displacement amount and accordingly discarded. This configuration enables a reduction of a memory capacity.

Furthermore, an origination point of a process of JPEG data is preferably identical with a start point of a feature point proximity zone, and the feature point proximity zone is preferably of a size (i.e., 8M by 8N, where M and N are natural numbers) expressed by multiples of a JPEG block size (8 by 8 pixels). For instance, it is possible to suppress a data volume to be processed to a minimum if a feature point is included in the decoded data by making the vertical direction of a decoding zone identical with a JPEG block size and the horizontal direction multiples thereof. In other words, if the size of decoding area is set independent of a JPEG block size as exemplified in FIG. 14, the JPEG blocks spanning from the zeroth to second columns vertically, and from the zeroth to second rows horizontally must be decoded in order to extract and decode a certain zone. For example, in order to decode the same size consecutively and examine a feature point, it is necessary to once again decode a block on the second column for the vertical direction and a block on the second row for the horizontal direction, consequently increasing a process volume. Therefore, making a decoding zone identical with the JPEG block size enables a suppression of a data volume to be processed and a high speed process.

Note that a range of a zone to be decoded at once is preferably made larger in the horizontal direction (i.e., a value of the above described N). A calculation of a displacement amount from a single decoded zone makes it possible to obtain a more accurate displacement amount as compared to the case of obtaining a displacement amount from a decoded zone which is divided into a plurality.

The displacement amount calculation method according to the present embodiment uses compressed data, including JPEG, et cetera, as image data to be synthesized for stabilizing an image. Therefore, it is possible to minimize a memory capacity to be secured for an image stabilization process. The method detects a feature point by using a thumbnail in advance for calculating a displacement amount of a figure between compressed images, followed by calculating a displacement amount by decoding a part corresponding to the feature point within the compressed data. There is no need to decode the entirety of the compressed data, and therefore an area of memory required for such processes can be minimized. Moreover, it is possible to search a zone of compressed data to be decoded, thereby enabling a high speed process.

Such is a description on the method for calculating a displacement amount by detecting a feature point by using one thumbnail. What follows here is a description of a displacement amount calculation method in the case of a plurality of thumbnails.

FIG. 15 is a diagram for describing data used for an image stabilization process according to a second embodiment. Referring to FIG. 15, the upper part represents JPEG data, that is, compressed data likewise the upper part of FIG. 7, which is the same as the above described embodiment. The lower part of FIG. 15 shows a thumbnail created for each image data obtained from the CCD camera 2.

Figure 16:
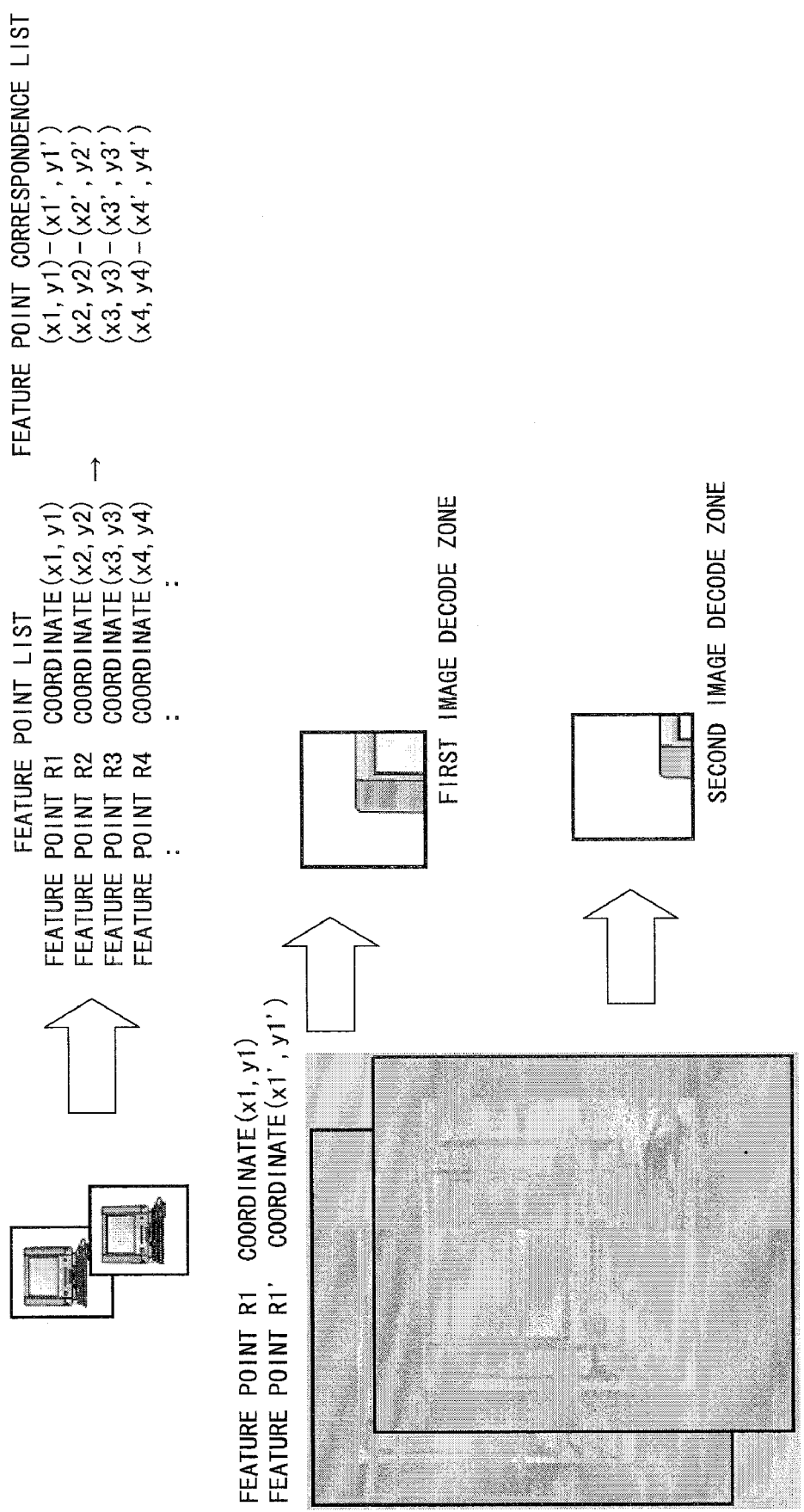
FIG. 16 is a diagram for describing a displacement amount calculation process according to the second embodiment.

FIG. 16 is a diagram for describing a displacement amount calculation process according to the second embodiment. It is different from the above described embodiment where the present embodiment carries out the process for detecting feature points Rn from thumbnails created for each image data.

That is, the present embodiment is configured to detect feature points Rn and Rn' respectively from thumbnails 1 and 2 corresponding to the first and second images. It then obtains feature points Tn corresponding to the feature points Rn detected from the thumbnail 1 as for the JPEG data of the first image, and feature points Tn' corresponding to the feature points Rn' detected from the thumbnail 2 as for the JPEG data of the second image.

Figure 17:
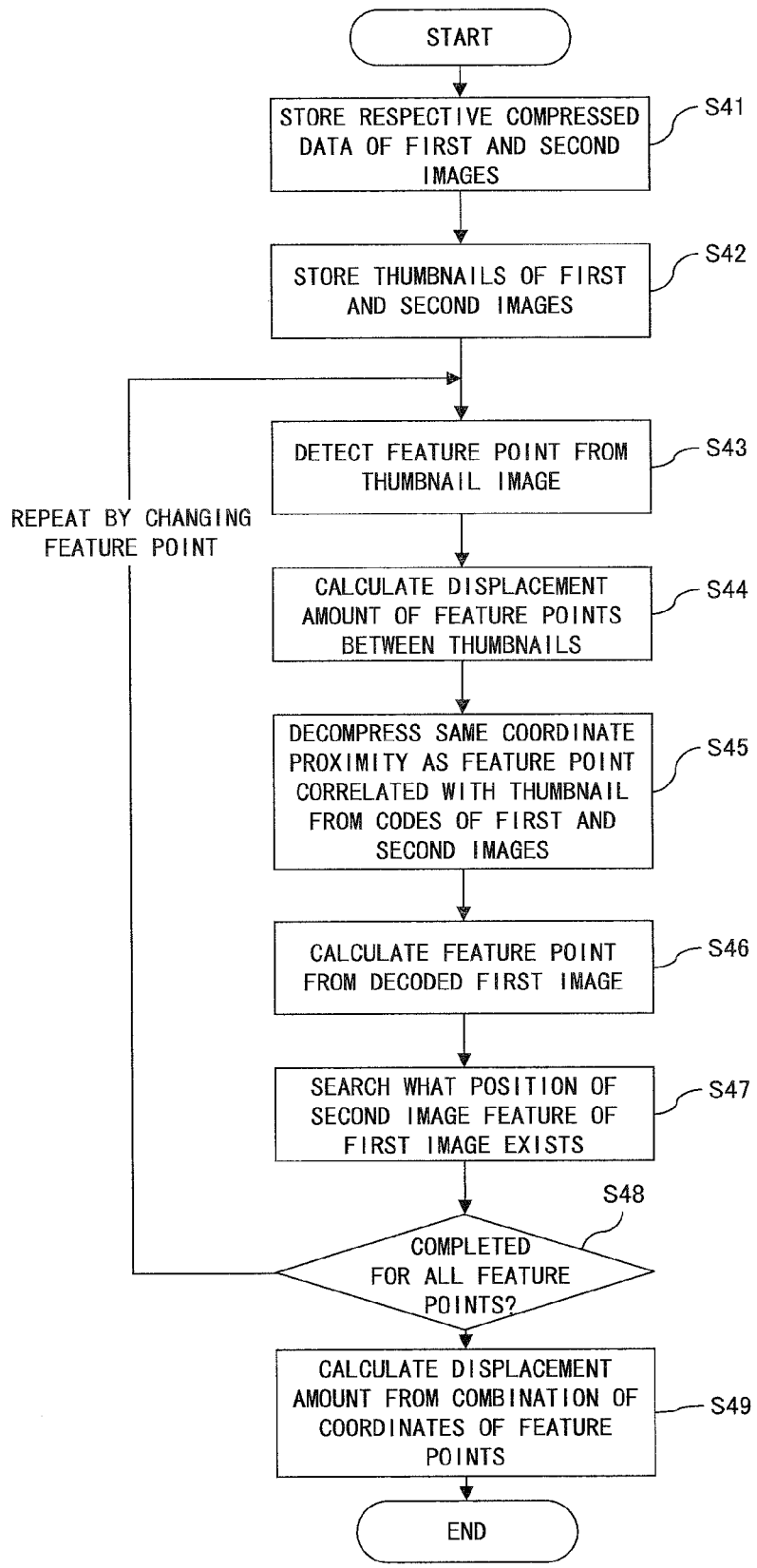
FIG. 17 is a flow chart showing a displacement amount calculation process according to the second embodiment.

FIG. 17 is a flow chart showing a displacement amount calculation process in the case of creating two thumbnails. The following is a description focused on the point different from the process shown in FIG. 11.

Step S41 makes compressed data of the first and second images respectively and stores them in memory, the processes of which are the same as the step S11. Step S42 creates thumbnails (i.e., thumbnails land 2) corresponding to the first and second images, respectively, and stores them in the memory. Step S43 detects feature points Rn and Rn' respectively from the thumbnails 1 and 2. Then, step S44 calculates a displacement amount of feature points between the thumbnails 1 and 2.

Step S45 decodes corresponding zones from respective compressed data of the first and second images based on the correlation between the feature points detected from the two thumbnails. The processes of the step S46 and thereafter respectively correspond to the processes of the step S15 and thereafter shown in FIG. 11. Note that the process for searching (i.e., the process of step S47) feature points Tn' of the second image corresponding to the feature points Tn obtained from the first image in the step S46 is different from the process of the first embodiment where present embodiment performs the process by referring to the displacement amount obtained for the feature point Rn and Rn' between the thumbnails in the step S44 previously.

As described above, the displacement amount calculation method according to the present second embodiment is configured to create a thumbnail for each image data and calculate, in advance, a displacement amount between the thumbnails from the feature points detected therefrom. Then it searches a feature point in the compressed data based on the calculated displacement amount between the thumbnails. Since a thumbnail is a relatively small capacity, accuracy of a displacement calculation process is improved without losing a benefit of the above described first embodiment in saving memory capacity.

Note that the above description describes the method for correcting an unsteady camera by calculating a displacement amount of a plurality of static images obtained from continuous shots, the present invention, however, is not limited as such. For example, the technique is applicable to a mosaicing for photographing a panorama picture, et cetera. Although data must be temporarily retained before integrating images for mosaicing, a use of compressed data makes it possible to minimize a memory capacity to be secured.

What is claimed is:

1. An imaging apparatus, comprising:
a compression unit for making compressed data by respectively compressing each piece of plural images obtained from an imaging device;
a compressed data retention unit for retaining each compressed data;
a thumbnail creation unit for creating a thumbnail from each of the images;
a thumbnail retention unit for retaining the thumbnail;
a detection unit for detecting a feature point from the thumbnail;
a decode unit for respectively decoding zones including the feature point from each compressed data; and
a calculation unit for obtaining positional information of the feature point in each of the decoded zones and calculating a displacement amount of each compressed data based on the positional information.

2. The imaging apparatus according to claim 1, further comprising
a synthesizing unit for synthesizing each decoded data which are divided zones and corrected based on said calculated displacement amount.

3. The imaging apparatus according to claim 1, wherein said thumbnail creation unit creates one thumbnail corresponding to certain compressed data among said plural compressed data.

4. The imaging apparatus according to claim 3, wherein said decode unit covers larger area for decoding from compressed data other than compressed data corresponding to said thumbnail than an area for decoding from said compressed data corresponding to said thumbnail.

5. The imaging apparatus according to claim 1, wherein said thumbnail creation unit creates a first and a second thumbnails corresponding to a first and a second compressed data,
said detection unit detects said feature points from the first and second thumbnails, respectively, and
said decode unit decodes zones including respective feature points from the first and second compressed data based on a displacement of positions between feature points detected from the first and second thumbnails.

6. The imaging apparatus according to claim 1, wherein a zone decoded by said decode unit is made up of 8M by 8N pixels (where M and N are natural numbers).

7. The imaging apparatus according to claim 1, wherein said decode unit decodes only a brightness signal component among compressed data made up of YUV format.

8. A computer readable recording medium recording a displacement amount calculation program for having a computer execute a control for calculating a displacement amount among a plurality of images, wherein the program makes the computer execute the processes of
making, and retaining, compressed data by respectively compressing each piece of plural images obtained from an imaging device;
creating, and retaining, a thumbnail from each of the image data;
detecting a feature point from the thumbnail;
respectively decoding zones including the feature point from each compressed data; and
obtaining positional information of the feature point in each of the decoded zones and calculating a displacement amount of each compressed data based on the positional information.

* * * * *